United States Patent
Attanasio

(10) Patent No.: US 9,611,877 B1
(45) Date of Patent: Apr. 4, 2017

(54) HONEYCOMB PANEL FASTENER

(71) Applicant: Gerald E. Attanasio, Middlebury, CT (US)

(72) Inventor: Gerald E. Attanasio, Middlebury, CT (US)

( * ) Notice: Subject to any disclaimer, the term of this patent is extended or adjusted under 35 U.S.C. 154(b) by 179 days.

(21) Appl. No.: 14/600,648

(22) Filed: Jan. 20, 2015

(51) Int. Cl.
  *F16B 5/01* (2006.01)

(52) U.S. Cl.
  CPC ..................... *F16B 5/01* (2013.01)

(58) Field of Classification Search
  CPC .......... F16B 5/01; F16B 5/0258; F16B 5/025; F16B 5/0266; F16B 5/10; F16B 21/04; Y10S 493/966; B60R 2021/0421; B60R 16/0222
  USPC ................ 16/2.1; 403/243, 351, 390, 408.1; 411/947, 303, 432, 82, 82.1, 349, 549, 411/552, 553; 244/131, 132, 123.13, 244/123.6, 118.5, 118.6, 119, 120, 117 R; 248/205.3, 220.21, 188.1, 346.01; 52/783.1, 783.12, 784.1, 787.1, 787.12, 52/790.1, 793.1, 793.11, 800.1, 799.1
  See application file for complete search history.

(56) References Cited

U.S. PATENT DOCUMENTS

| | | | | |
|---|---|---|---|---|
| 2,975,667 A | * | 3/1961 | Bross | F16B 5/10 411/521 |
| 3,019,865 A | * | 2/1962 | Rohe | F16B 5/01 411/82 |
| 3,305,996 A | | 2/1967 | Shapiro | |
| 3,339,609 A | | 9/1967 | Cushman | |
| 3,526,072 A | * | 9/1970 | Campbell | F16B 5/01 29/452 |
| 3,564,563 A | * | 2/1971 | Trotter et al. | F16B 5/10 411/191 |
| 3,579,942 A | | 5/1971 | Cole | |
| 3,884,006 A | | 5/1975 | Dietlein | |
| 4,296,586 A | | 10/1981 | Heurteux | |
| 4,370,372 A | | 1/1983 | Higgins | |
| 4,522,541 A | * | 6/1985 | Bidwell | F16B 5/10 24/DIG. 53 |

(Continued)

FOREIGN PATENT DOCUMENTS

EP 0273515 7/1988

OTHER PUBLICATIONS

Genuine Aircraft Hardware Co. NAS1832 thru NAS1836, Inserts 2010, United States.
The Young Engineers, Inc. 2013, United States.

*Primary Examiner* — Theodore Adamos
(74) *Attorney, Agent, or Firm* — Raymond A. Nuzzo

(57) ABSTRACT

One aspect of the invention involves a honeycomb panel insert for use with a honeycomb panel. The insert comprises a generally cylindrical body having a cylindrical outer peripheral surface, a first end, an opposite second end and a longitudinally extending passage having a first opening in the first end and a second opening in the second end. The first opening has a first perimeter and the second opening has a second perimeter that is relatively smaller than the first perimeter. The longitudinally extending passage has a first section having a first diameter, a second section having a second diameter that is relative smaller than the first diameter and a third section having a third diameter that is relatively smaller than the second diameter. The difference between the first and second diameters provides a first ledge and the difference between the second and third diameters provides a second ledge.

10 Claims, 20 Drawing Sheets

(56) References Cited

U.S. PATENT DOCUMENTS

| | | | | |
|---|---|---|---|---|
| 4,846,612 A * | 7/1989 | Worthing | | B29C 65/645 411/258 |
| 4,973,208 A * | 11/1990 | Gauron | | B29C 70/68 411/258 |
| 5,240,543 A * | 8/1993 | Fetterhoff | | F16B 5/01 156/293 |
| 5,445,483 A | 8/1995 | Fultz | | |
| 6,055,790 A * | 5/2000 | Lunde | | F16B 5/01 52/787.1 |
| 6,309,158 B1 * | 10/2001 | Bellinghausen | | F16B 5/0208 411/107 |
| 6,837,659 B2 | 1/2005 | Oberkofler | | |
| 7,802,953 B2 * | 9/2010 | Stephen | | F16B 5/0208 411/246 |
| 8,136,328 B2 | 3/2012 | Erickson | | |
| 8,409,395 B2 | 4/2013 | Schumacher | | |
| 8,434,983 B2 * | 5/2013 | Chen | | F16B 5/0208 411/347 |
| 8,439,615 B2 * | 5/2013 | Wu | | H05K 7/1407 411/107 |
| 8,561,742 B2 | 10/2013 | Pedret | | |
| 2002/0164227 A1 * | 11/2002 | Van Gent | | F16B 37/0892 411/432 |
| 2003/0223843 A1 * | 12/2003 | Chen | | B24B 45/006 411/432 |
| 2006/0137294 A1 | 6/2006 | Waits | | |
| 2008/0025813 A1 * | 1/2008 | Wu | | H05K 7/1407 411/353 |
| 2008/0038090 A1 * | 2/2008 | Figge | | F16B 5/025 411/433 |
| 2008/0116094 A1 * | 5/2008 | Truong | | F16B 5/01 206/338 |
| 2008/0292425 A1 * | 11/2008 | Pineiros | | F16B 37/044 411/92 |
| 2008/0302060 A1 * | 12/2008 | Ciprian | | B64C 1/06 52/787.12 |
| 2009/0080998 A1 * | 3/2009 | Nagayama | | F16B 3/06 411/432 |
| 2016/0258460 A1 * | 9/2016 | Gorodinsky | | F16B 5/025 |

* cited by examiner

HONEYCOMB PANEL FASTENER

STATEMENT OF GOVERNMENT INTEREST

Not applicable.

CROSS REFERENCE TO OTHER PATENT APPLICATIONS

None.

TECHNICAL FIELD

The present invention relates to fasteners for use with honeycomb panels, sandwich-type panels or similar panels.

BACKGROUND

Fasteners for use with honeycomb or sandwich panels are described in U.S. Pat. No. 3,339,609, entitled "Floating Nut Insert", U.S. Pat. No. 3,884,006, entitled "Sandwich Panel Insert", U.S. Pat. No. 4,846,612, entitled "Sandwich Panel Fastener" and U.S. Pat. No. 5,082,405, entitled "Potted Insert For Honeycomb Panels".

FIGS. 1 and 2 show a prior art fastener assembly for use with a honeycomb panel. The prior art fastener assembly utilizes a stud 1, spring 2, insert 3 and cross pins 4 and 5. Cross pin 4 is frictionally inserted into bore 6 and cross pin 5 is frictionally inserted into bore 7. In order to use this fastener assembly, the user or installer first removes the cross pins 4 and 5 from bores 6 and 7, respectively. Next, the user cements insert 3 to the honeycomb panel using any of the techniques known in the art. After the cement hardens, the user inserts the stud 1 through the spring 2 and then inserts the stud 1 and spring 2 into the insert 3. The user applies force to the stud 1 in order to compress the spring 2. This causes the stud 1 to longitudinally move within the passage of the insert 3 so that bores 6 and 7 become exposed as shown in FIG. 2. The user then reinserts cross pins 4 and 5 into bores 6 and 7, respectively. The process of removing cross pins 4 and 5 from the bores 6 and 7, respectively, and then re-installing the cross pins 4 and 5 after the insert 3 is cemented to the honeycomb panel is a time consuming process. Furthermore, in such a process, it is very easy to drop or mishandle the relatively small-sized cross pins 4 and 5 while trying to reinsert them into the bores 6 and 7, respectively.

Accordingly, there is a need for a new fastener for use with honeycomb or sandwich-type panels that eliminates the problems associated with the prior art fastener assembly shown in FIGS. 1 and 2.

SUMMARY

The above deficiencies and other problems associated with the particular prior art fastener assembly of FIGS. 1 and 2 are reduced or eliminated by the disclosed fastener assembly of the present invention.

In one aspect, the present invention is directed to a honeycomb panel insert (12) for use with a honeycomb panel, comprising a generally cylindrical body (13) having an outer surface (14), a first end (16), an opposite second end (18) and a longitudinally extending passage (20) having a first opening (22) in the first end (16) and a second opening (24) in the second end (18). The first opening (22) has a first perimeter and the second opening (24) has a second perimeter that is relatively smaller than the first perimeter. The longitudinally extending passage (20) comprises a first section (30) having a first diameter D1, a second section (40) having a second diameter D2 that is relative smaller than the first diameter D1 and a third section (50) having a third diameter D3 that is relatively smaller than the second diameter D2. The difference between the first diameter D1 and the second diameter D2 provides a first ledge (60) and the difference between the second diameter D2 and the third diameter D3 provides a second ledge (62). The first end (16) further comprises a first flange section (70) that has a periphery (71). The first flange section (70) has a pair of notches (100, 102) located in diametrically opposed positions along the periphery (71). The second end (18) further comprises a second flange section (72) that has periphery (73). The second section (40) of the longitudinally extending passage (20) has an inner wall (80) and the third section (50) of the longitudinally extending passage (20) has an inner wall (82). The inner walls (80) and (82) have therein longitudinally extending and diametrically positioned channels (90) and (92). The channels (90) and (92) extend to the second end (18) such that the channels (90) and (92) form portions of the perimeter of the second opening (24).

In another aspect, the present invention is directed to a fastener assembly (200) for use with honeycomb panels, comprising a honeycomb panel insert (12) which comprises a generally cylindrical body (13) having an outer surface (14), a first end (16), an opposite second end (18) and a longitudinally extending passage (20) having a first opening (22) in the first end (16) and a second opening (24) in the second end (18). The first opening (22) has a first perimeter and the second opening (24) has a second perimeter that is relatively smaller than the first perimeter. The longitudinally extending passage (20) comprises a first section (30) having a first diameter D1, a second section (40) having a second diameter D2 that is relative smaller than the first diameter D1 and a third section (50) having a third diameter D3 that is relatively smaller than the second diameter D2. The difference between the first diameter D1 and the second diameter D2 provides a first ledge (60) and the difference between the second diameter D2 and the third diameter D3 provides a second ledge (62). The first end (16) further comprises a first flange section (70) that has a periphery (71). The first flange section (70) has a pair of notches (100, 102) located in diametrically opposed positions along the periphery (71). The second end (18) further comprises a second flange section (72) that has a periphery (73). The second section (40) of the longitudinally extending passage (20) has an inner wall (80) and the third section (50) of the longitudinally extending passage (20) has an inner wall (82). The inner walls (80) and (82) have therein longitudinally extending and diametrically positioned channels (90) and (92) that extend to the second end (18) such that the channels (90) and (92) form portions of the perimeter of the second opening (24). The fastener assembly (200) further comprises a stud (202) which comprises a head (204) and a shaft (206) that is attached to the head (204). The shaft (206) extends to a distal end (208) along a longitudinally extending axis (210). The stud (202) further comprises a cross pin (212) that extends through the shaft (206) and is orthogonal with respect to the longitudinally extending axis (210). The cross pin (212) has a first section (214) and a second section (216). The shaft (206) has a diameter that is sized to fit through the longitudinally extending passage (20). The first section (214) and second section (216) are sized to fit within and move along channels (90) and (92), respectively. The head (204) has a predetermined diameter that is greater than the second diameter D2 of the second section (40) and less than the first diameter D1 of the first section (30) so the head (204) abuts the first ledge (60) when the stud (202) is completely inserted or depressed into the longitudinally extending passage (20). The fastener assembly (200) further comprises a spring (250) that is mounted on the shaft (206) and interposed between the head (204) and the cross pin (212). The spring (250) has a predetermined diameter that is less than the second diameter D2 of the second section (40) and greater than the third diameter D3 of the third section (50) so that the spring (250) abuts the second ledge (62) when the stud (202) is inserted into the longitudinally extending passage (20). The shaft (206) has a circumferential channel (240) therein at a predetermined location between the head (204) and the cross pin (212). When an axial force is applied to the head (204) of the stud (202) so that the shaft (206) moves longitudinally within the passage (20) in a first direction (280) and the spring (250) is compressed, the circumferential channel (240) becomes exposed and in proximity to the second end (18) of the insert (12). The fastener assembly (200) further comprises a containment ring (300) that is external to the insert (12) and positioned within the circumferential channel (240) of the shaft (206) so as to maintain the spring (250) in a compressed state. Compression of the spring (250) urges the stud (202) to move longitudinally within the passage (20) in a second direction (282) that is opposite the first direction (280) thereby causing the containment ring (300) to abut the second end (18) of the insert (12) thereby limiting the movement of the stud (202) in the second direction (282).

DETAILED DESCRIPTION

Figure 1:
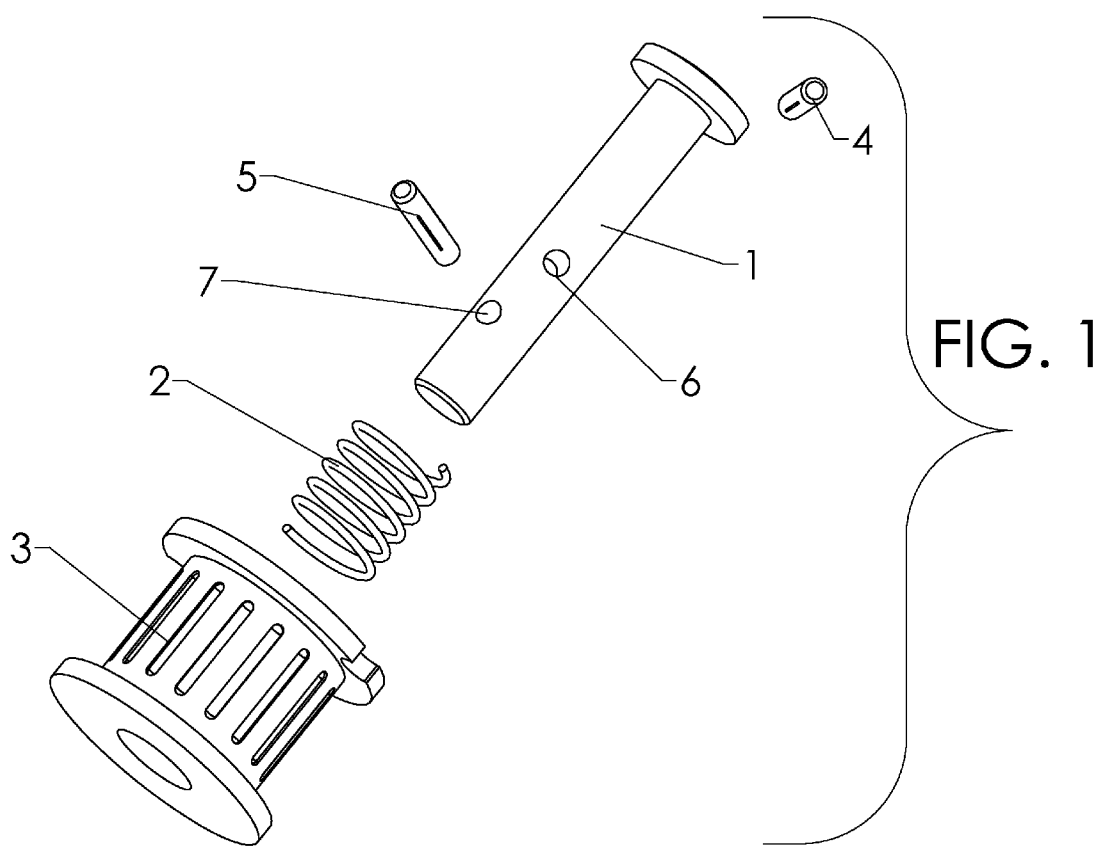
FIG. 1 is an exploded view, in perspective, of a prior art fastener assembly for use with a honeycomb panel.
Figure 2:
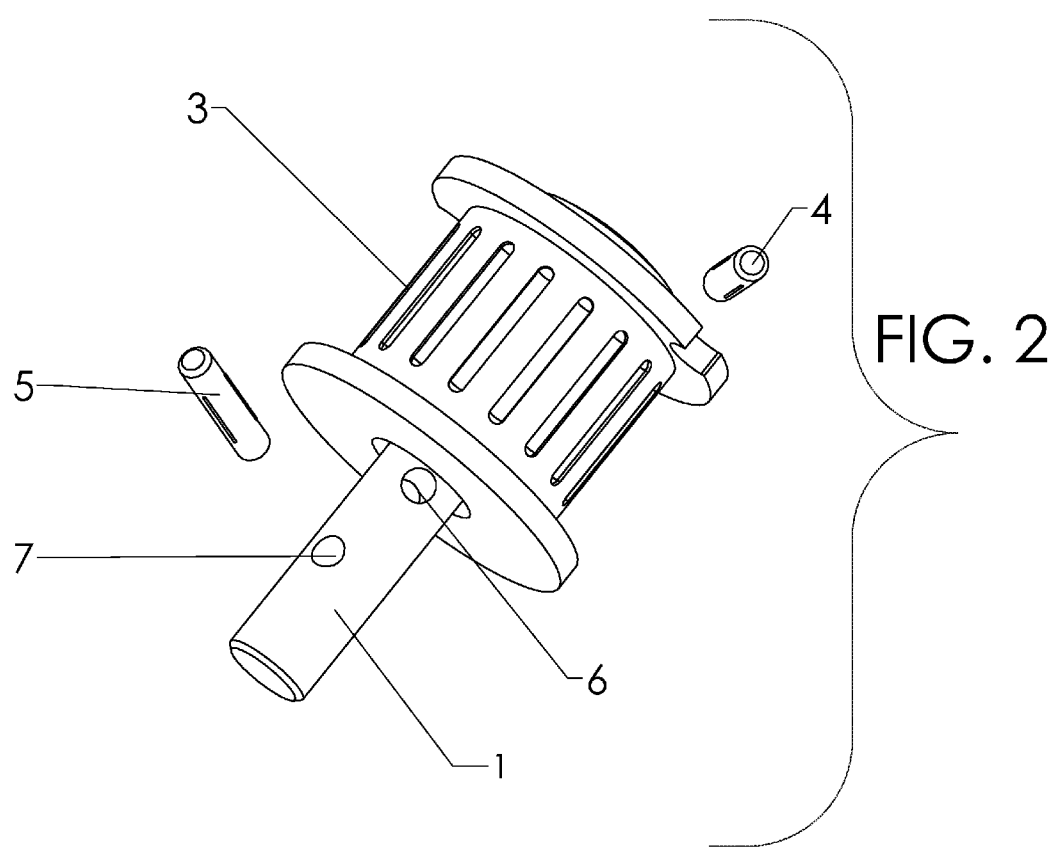
FIG. 2 is another exploded view, in perspective, of the prior art fastener assembly of FIG. 1.
Figure 3:
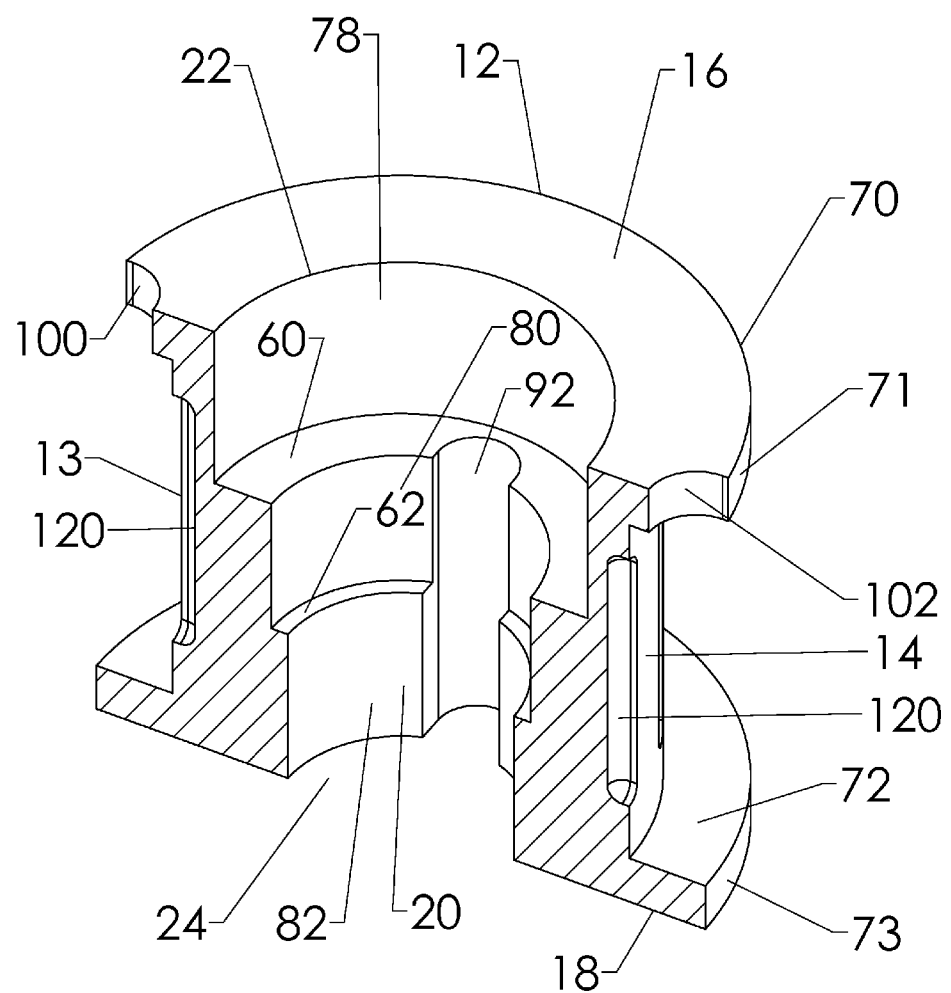
FIG. 3 is a cross-sectional view, in perspective, of an insert of the fastener assembly of the present invention.
Figure 4:
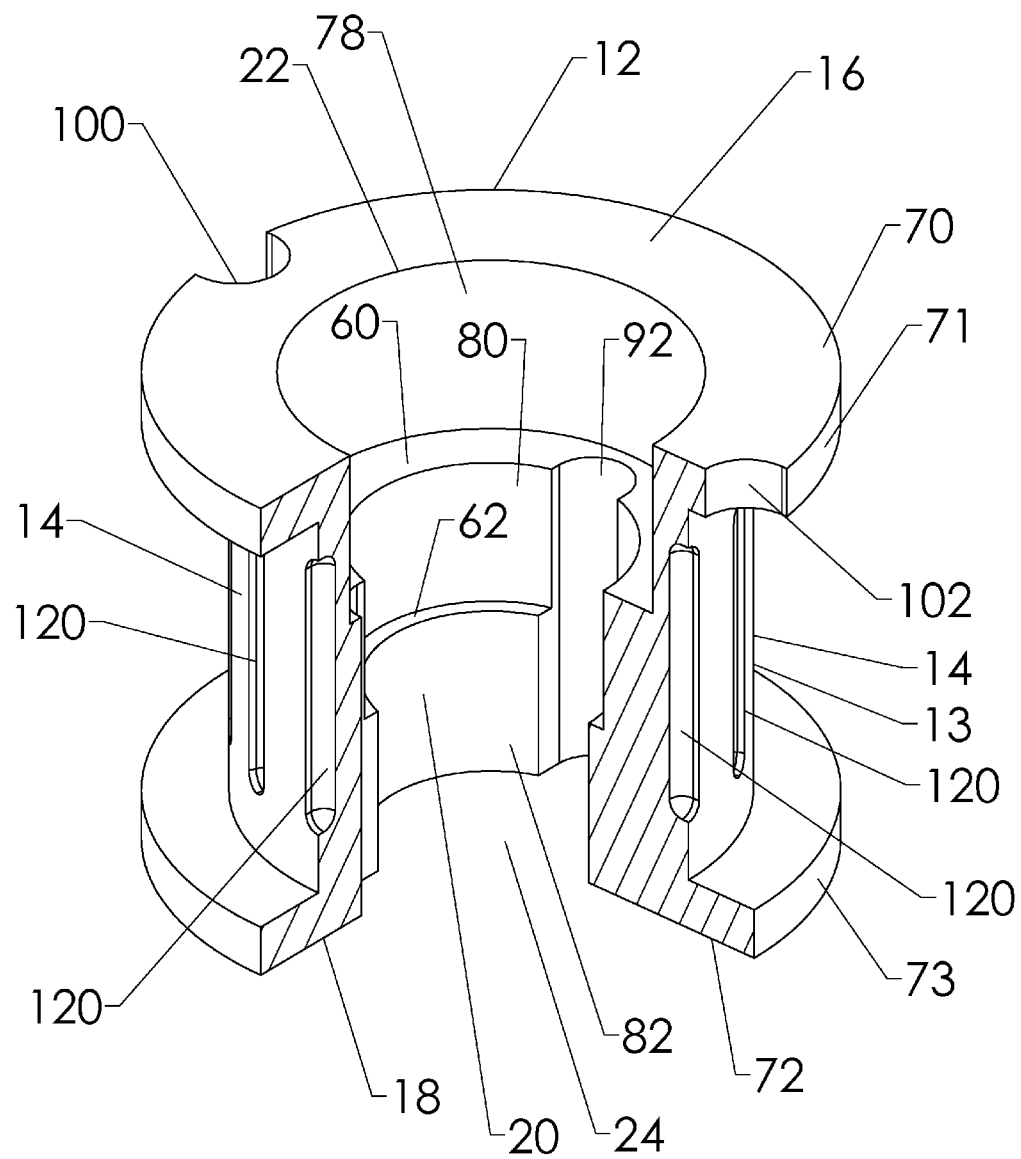
FIG. 4 is a sectional view, in perspective, of the insert.
Figure 5:
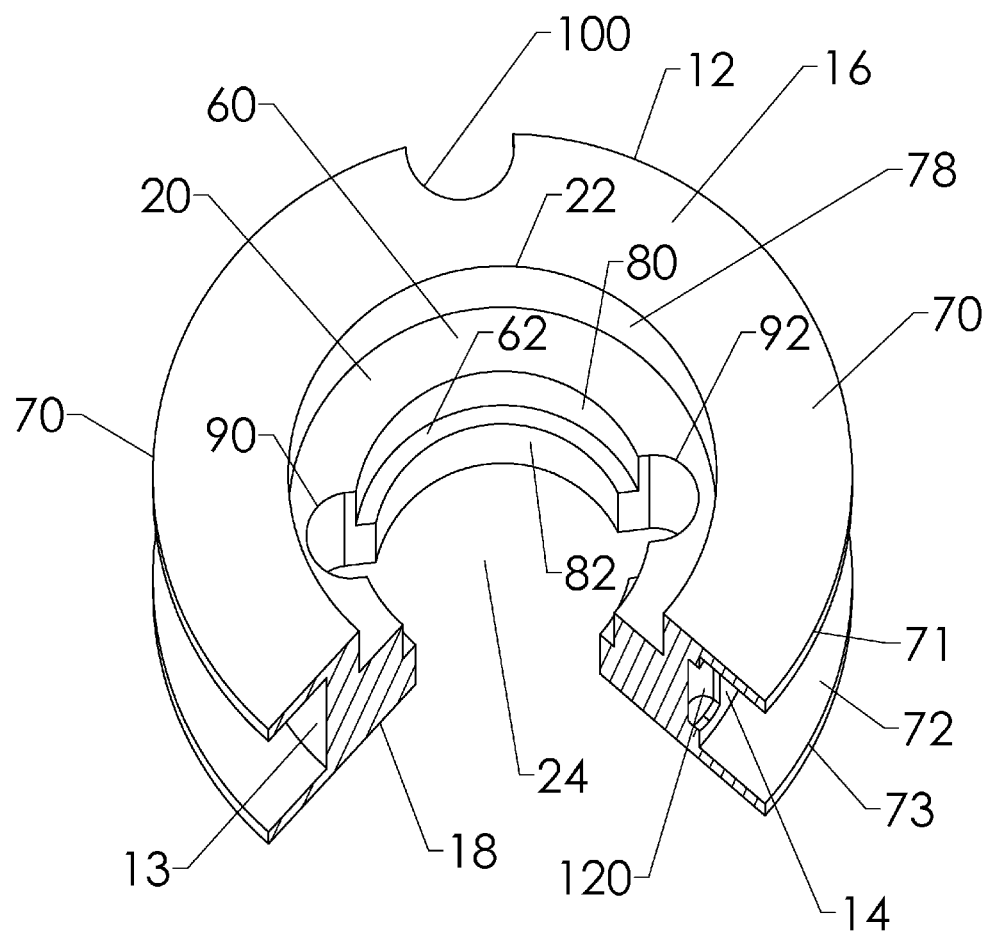
FIG. 5 is another sectional view, in perspective, of the insert as seen looking down into the interior of the insert.
Figure 6:
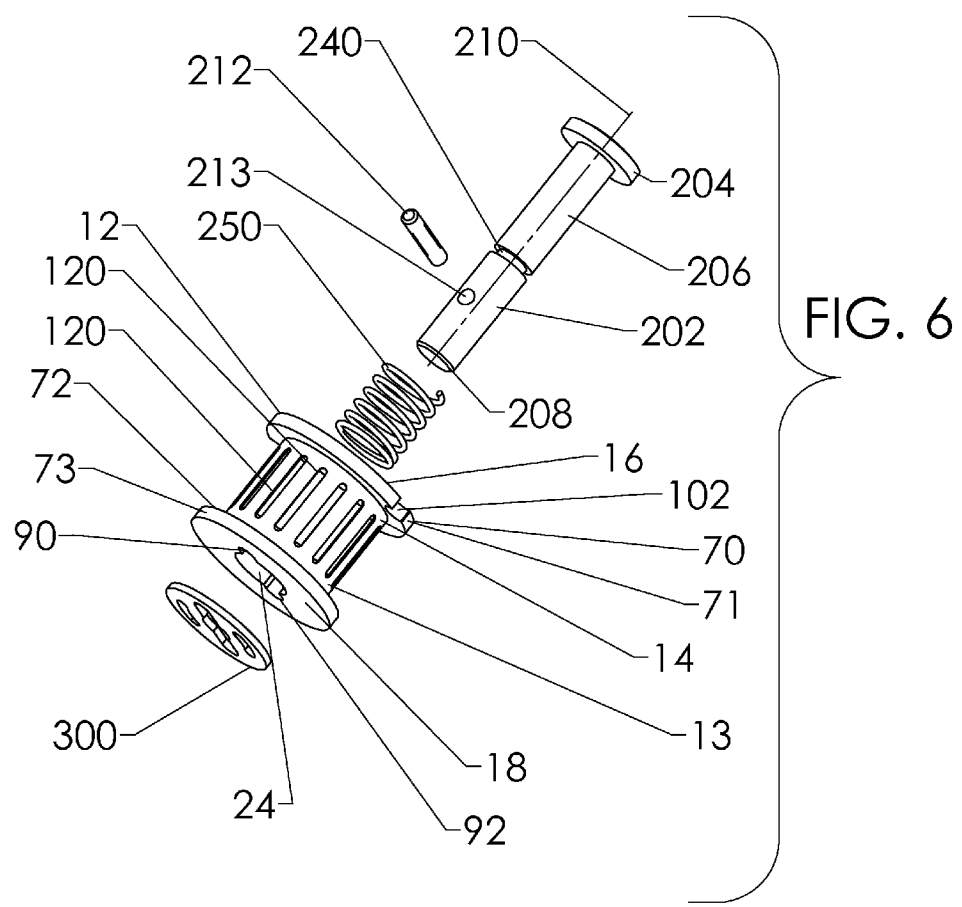
FIG. 6 is an exploded view of the fastener assembly in an accordance with an embodiment of the present invention.
Figure 7:
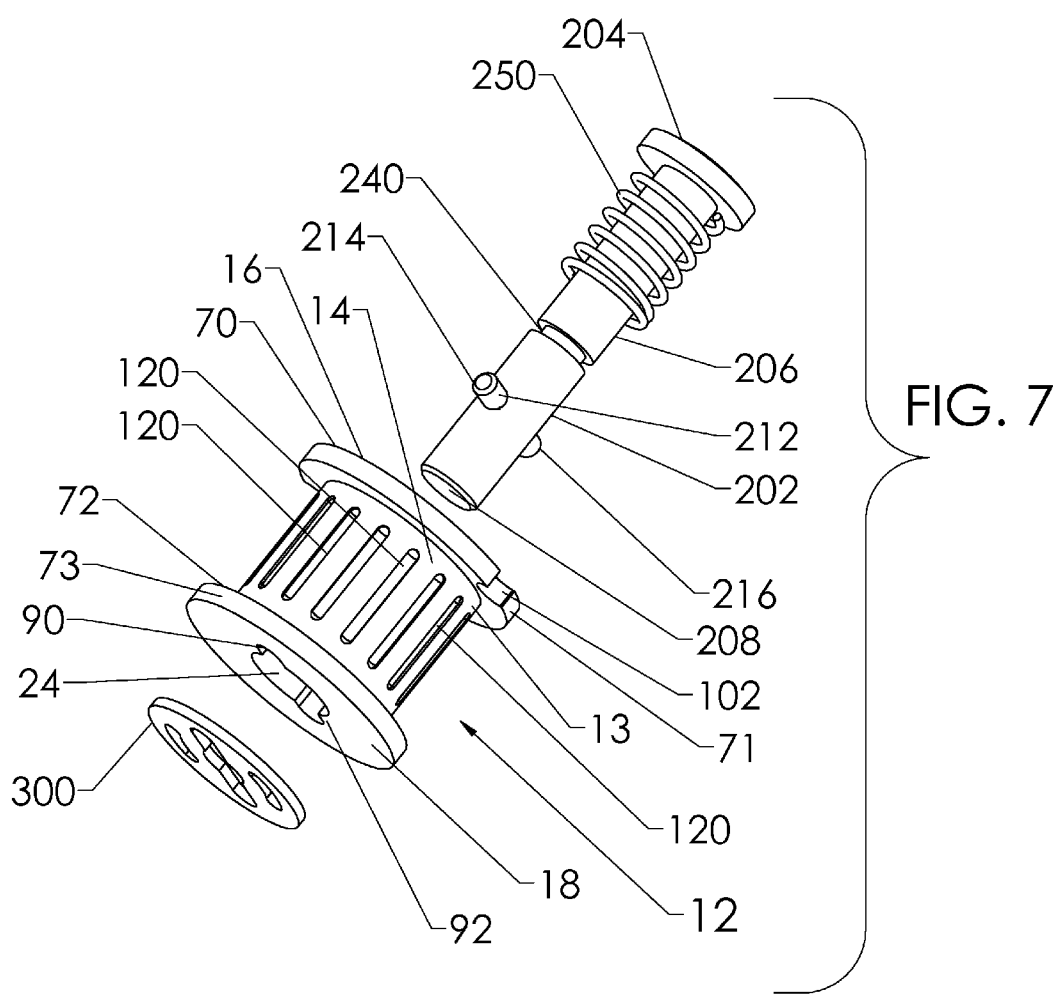
FIG. 7 is another exploded view of the fastener assembly, the view showing a spring positioned on the stud and a cross pin attached to the stud.

Referring to FIGS. 3-5 and 9-14, there is shown a fastener assembly 200 configured for use with a honeycomb panel in accordance with one embodiment of the present invention. Fastener assembly 200 comprises a honeycomb panel insert 12 that comprises a generally cylindrical body 13 having an outer surface 14, a first end 16, and an opposite second end 18. The honeycomb panel insert 12 includes a longitudinally extending passage 20 which has a first opening 22 in first end 16 and a second opening 24 in second end 18. The first opening 22 has a first perimeter and the second opening 24 has a second perimeter that is relatively smaller than the first perimeter of the first opening 22.

The longitudinally extending passage 20 comprises a first section 30 having a first diameter D1, a second section 40 having a second diameter D2 that is relative smaller than the first diameter D1 and a third section 50 having a third diameter D3 that is relatively smaller than the second diameter D2. The difference between the first and second diameters D1 and D2, respectively, provides a first circumferentially extending ledge 60 and the difference between the second and third diameters D2 and D3, respectively, provides a second circumferentially extending ledge 62.

The first end 16 further comprises a first flange section 70 that has a periphery 71. The second end 18 further comprises a second flange section 72 that has a periphery 73. The first flange section 70 has a pair of notches 100 and 102 located in diametrically opposed positions along the periphery 71. As will be explained in the ensuing description, notches 100 and 102 function as potting and vent openings.

Figure 15:
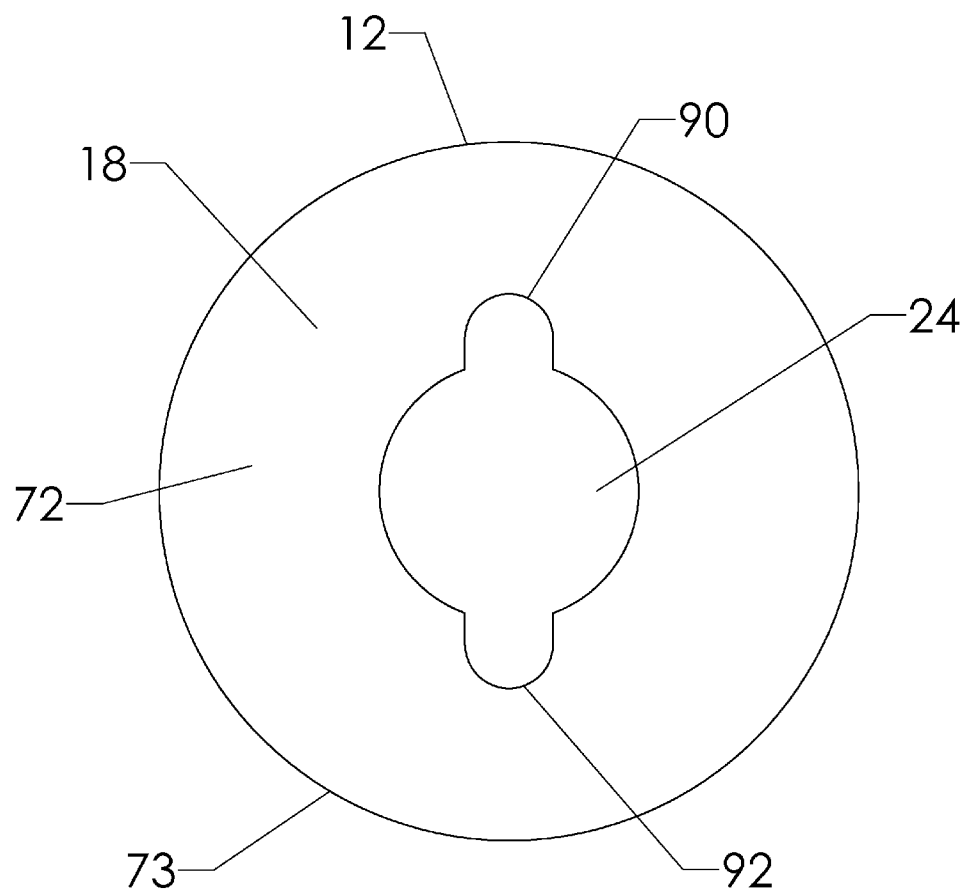
FIG. 15 is a bottom view of the insert.
Figure 16:
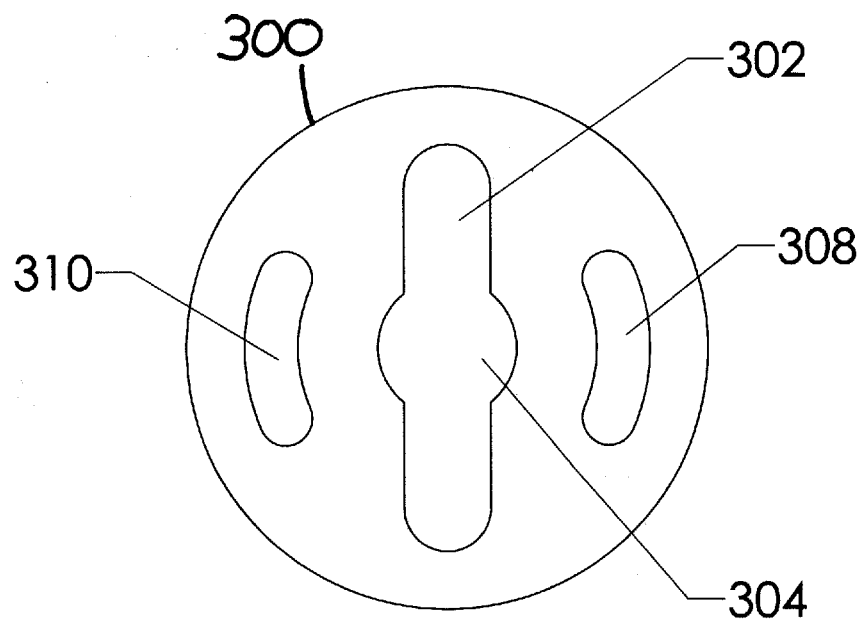
FIG. 16 is a plan view of the containment ring.

The first section 30 of the longitudinally extending passage 20 has a circumferentially extending inner wall 78. The second section 40 of the longitudinally extending passage 20 has a circumferentially extending inner wall 80. The third section 50 of the longitudinally extending passage 20 has a circumferentially extending inner wall 82. The inner walls 80 and 82 have therein longitudinally extending and diametrically positioned channels 90 and 92. The channels 90 and 92 extend to the second end 18 such that the channels 90 and 92 form portions of the perimeter of the second opening 24 (see FIG. 15).

The generally cylindrical body 13 has at least one longitudinally extending channel 120 in the outer surface 14. In a preferred embodiment, there is a plurality of longitudinally extending channels 120. In one embodiment, the longitudinally extending channels 120 are equidistantly spaced apart. Insert 12 is configured to be cemented to a honeycomb or sandwich-type panel. As is known in the art, resinous material, such as epoxy resin, is used to cement and anchor the insert 12 to the honeycomb or sandwich-type panel. Once the insert 12 is positioned at the desired location on the honeycomb panel, the unsolidified cement is injected into the notch 100 in the flange 70 until an excess of the unsolidified cement exits the notch 102. The unsolidified cement may also be injected into notch 102 until an excess of the unsolidified cement exits the notch 100. The unsolidified cement fills the channels 120 in the outer peripheral surface 14. Upon hardening, the hardened or solidified cement permanently cements the insert 12 to the honeycomb panel. The hardened cement within the channels 120 prevents the insert 12 from any rotational movement.

In a preferred embodiment, the insert 12 is formed from a composite material. In one embodiment, the insert 12 is fabricated from Ultem™.

Referring to FIGS. 6-8, 11-13, 17 and 18, fastener assembly 200 further comprises a stud 202. The stud 202 comprises a head 204 and a shaft 206. Shaft 206 is attached to the head 204 and extends to a distal end 208 along a longitudinally extending axis 210. In one embodiment, the distal end 208 is beveled. The stud 202 further comprises a cross pin 212 that extends through the shaft 206 and is orthogonal with respect to the longitudinally extending axis 210. The cross pin 212 has a first section 214 and a second section 216 that extend from the shaft 206 in opposite directions. In one embodiment, the shaft 206 has a bore 213 that has a pair of openings. The cross pin 212 has a predetermined diameter that requires the cross pin 212 to be force-fitted through the bore 213. The bore 213 extends in a direction that is substantially orthogonal to the longitudinally extending axis 210. In an alternate embodiment, cross pin 212 is integral with the shaft 206.

Figure 17:
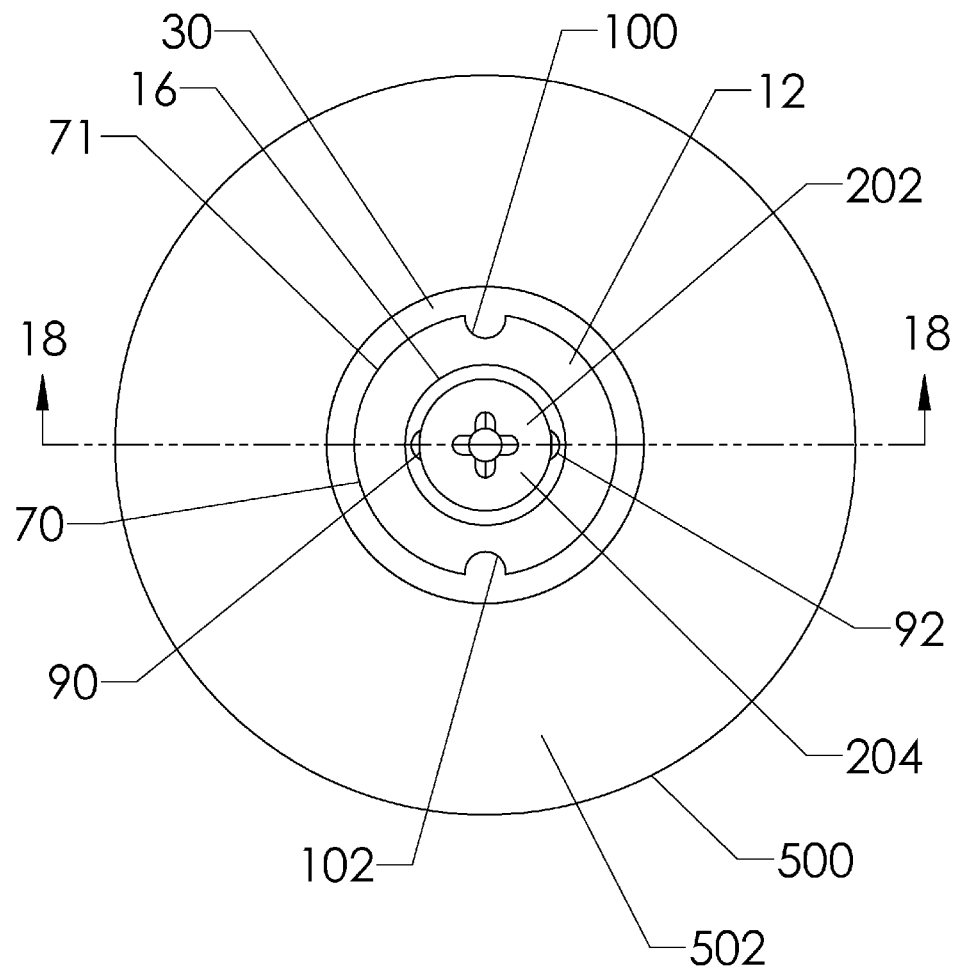
FIG. 17 is a view of the fastener assembly used on a honeycomb panel.
Figure 18:
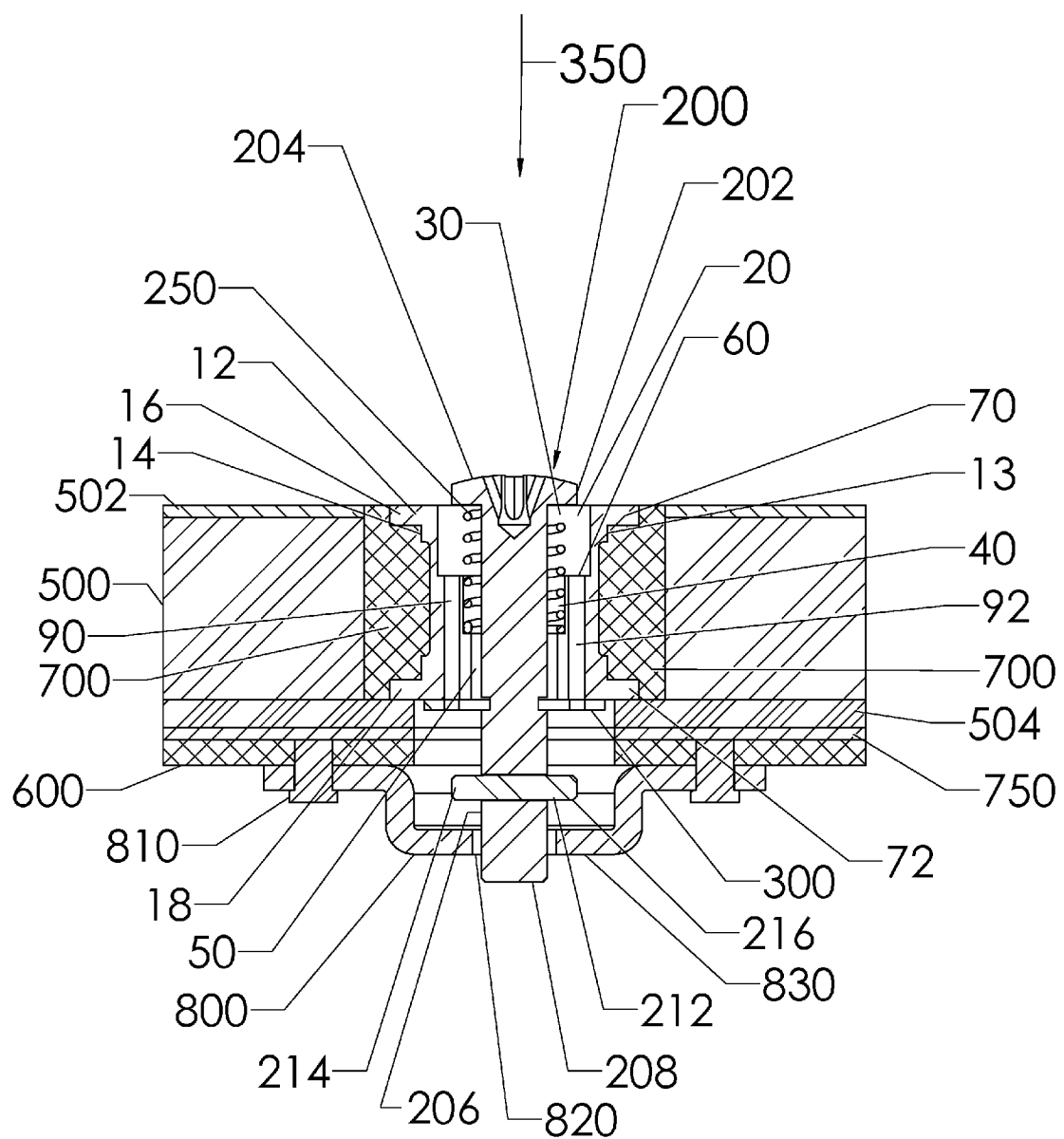
FIG. 18 is a cross-sectional view taken along line 18-18 of FIG. 17.

Referring to FIGS. 6-8, 11-13, 17 and 18, the shaft 206 has a diameter that is sized to fit through the longitudinally extending passage 20. The first section 214 and second section 216 of cross pin 212 are sized to fit within and move along channels 90 and 92, respectively. The head 204 of stud 202 has a predetermined diameter that is greater than the diameter D2 of the second section 40 of passage 20 and less than the diameter D1 of the first section 30 of passage 20 so that when an axial force 350 is applied to stud 202 as shown in FIG. 18, the stud 202 will move longitudinally through passage 20 until the head 204 abuts the first ledge 60.

Referring to FIGS. 6, 7, 12 and 13, the fastener assembly 200 further comprises a spring 250 that is mounted on the shaft 206 and interposed between the head 204 and the cross pin 212. The spring 250 has a predetermined diameter that is less than the diameter D2 of the second section 40 and greater than the diameter D3 of the third section 50 so that the spring 250 abuts the second ledge 62 when the stud 202 is inserted into the longitudinally extending passage 20.

Figure 10:
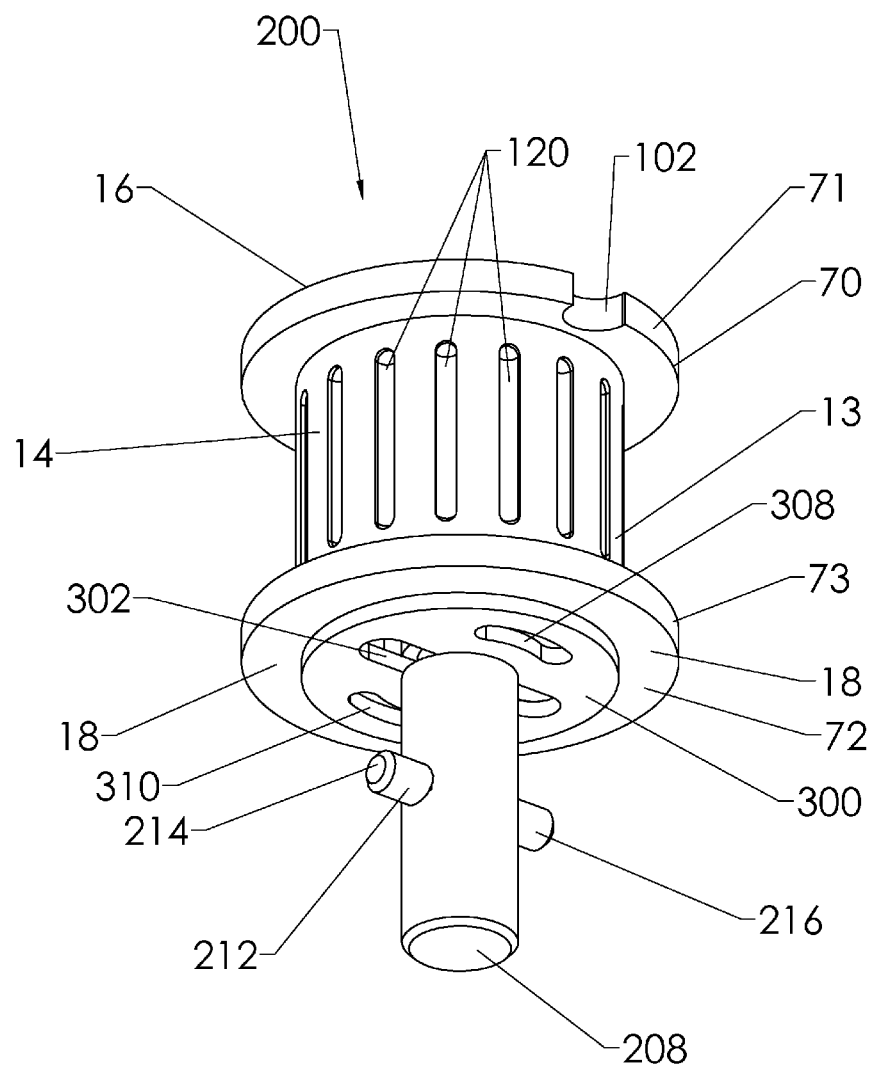
FIG. 10 is a perspective view of the completely assembled fastener assembly, the view showing the containment ring abutting the insert.
Figure 11:
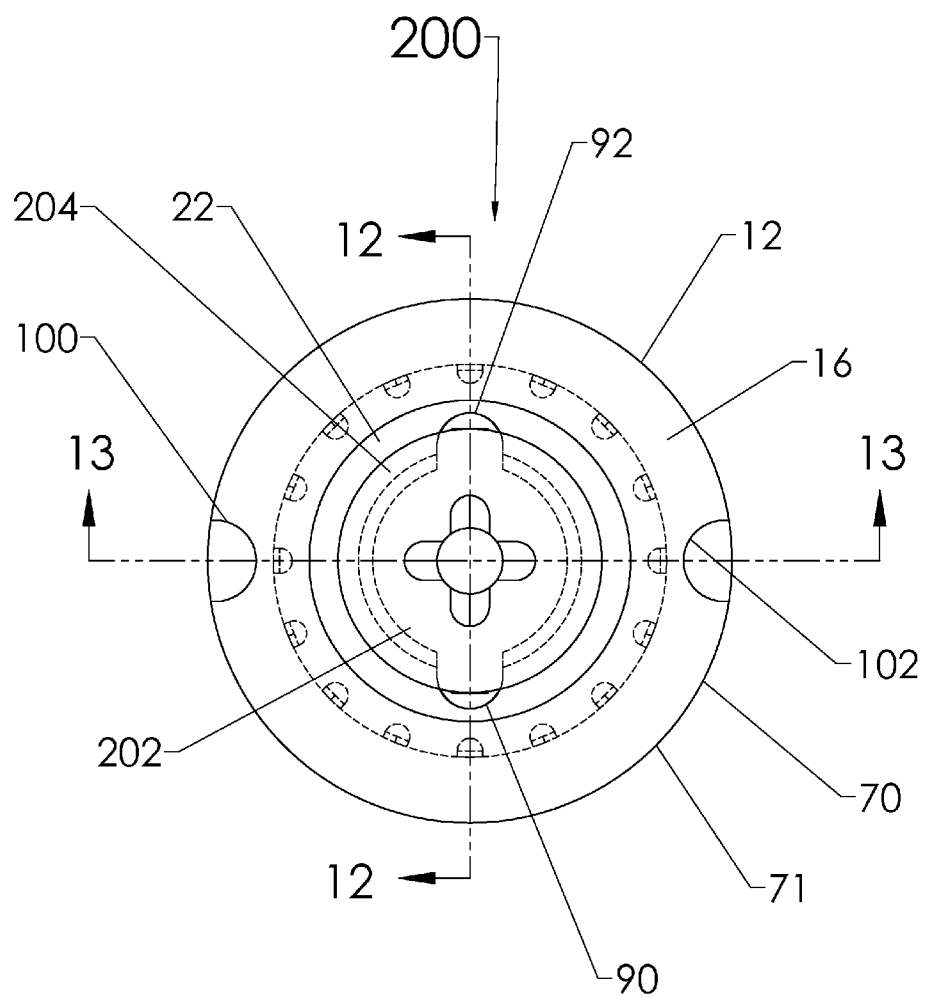
FIG. 11 is a top view of the completely assembled fastener assembly.
Figure 12:
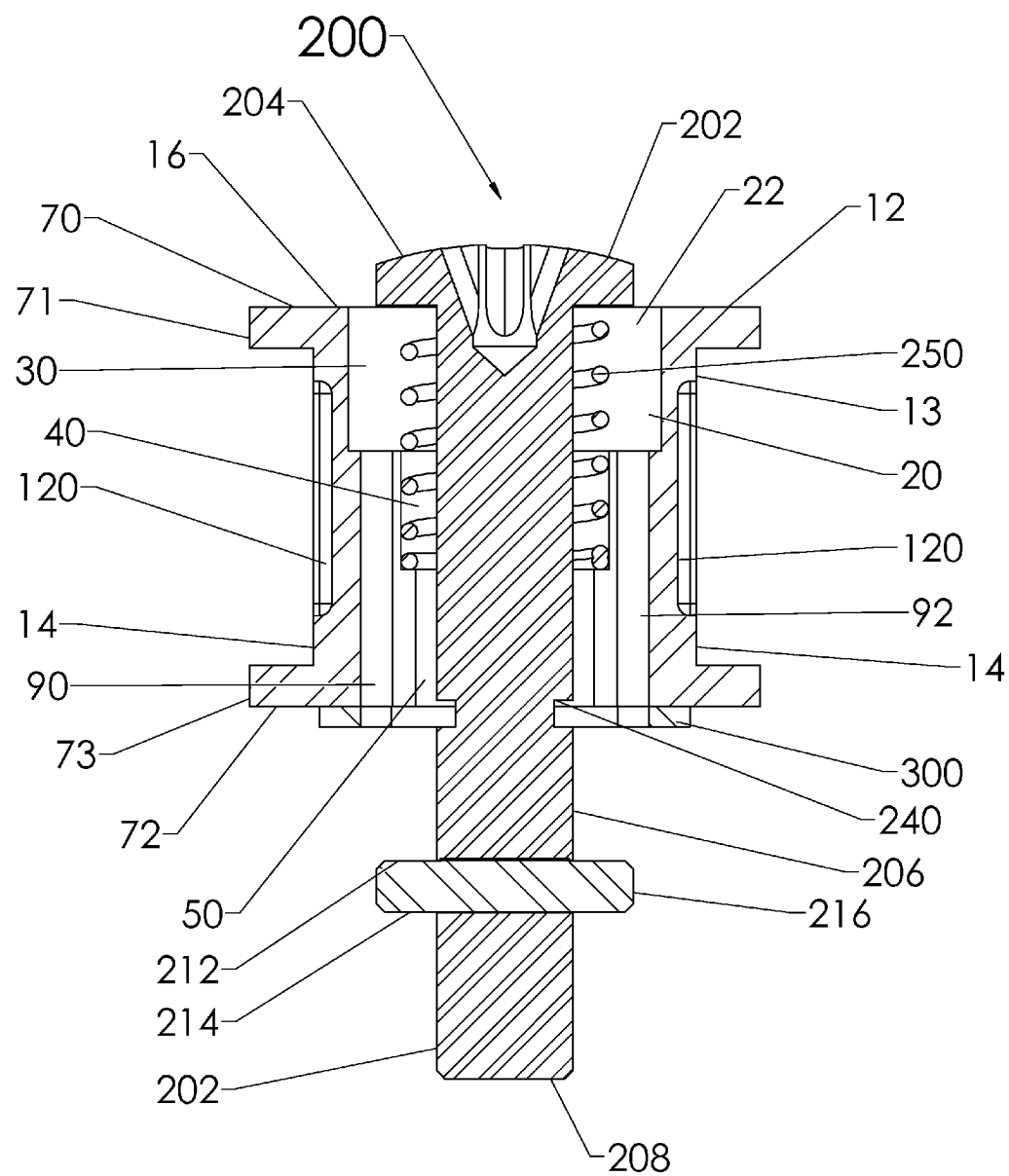
FIG. 12 is a cross-sectional view taken along line 12-12 of FIG. 11.
Figure 13:
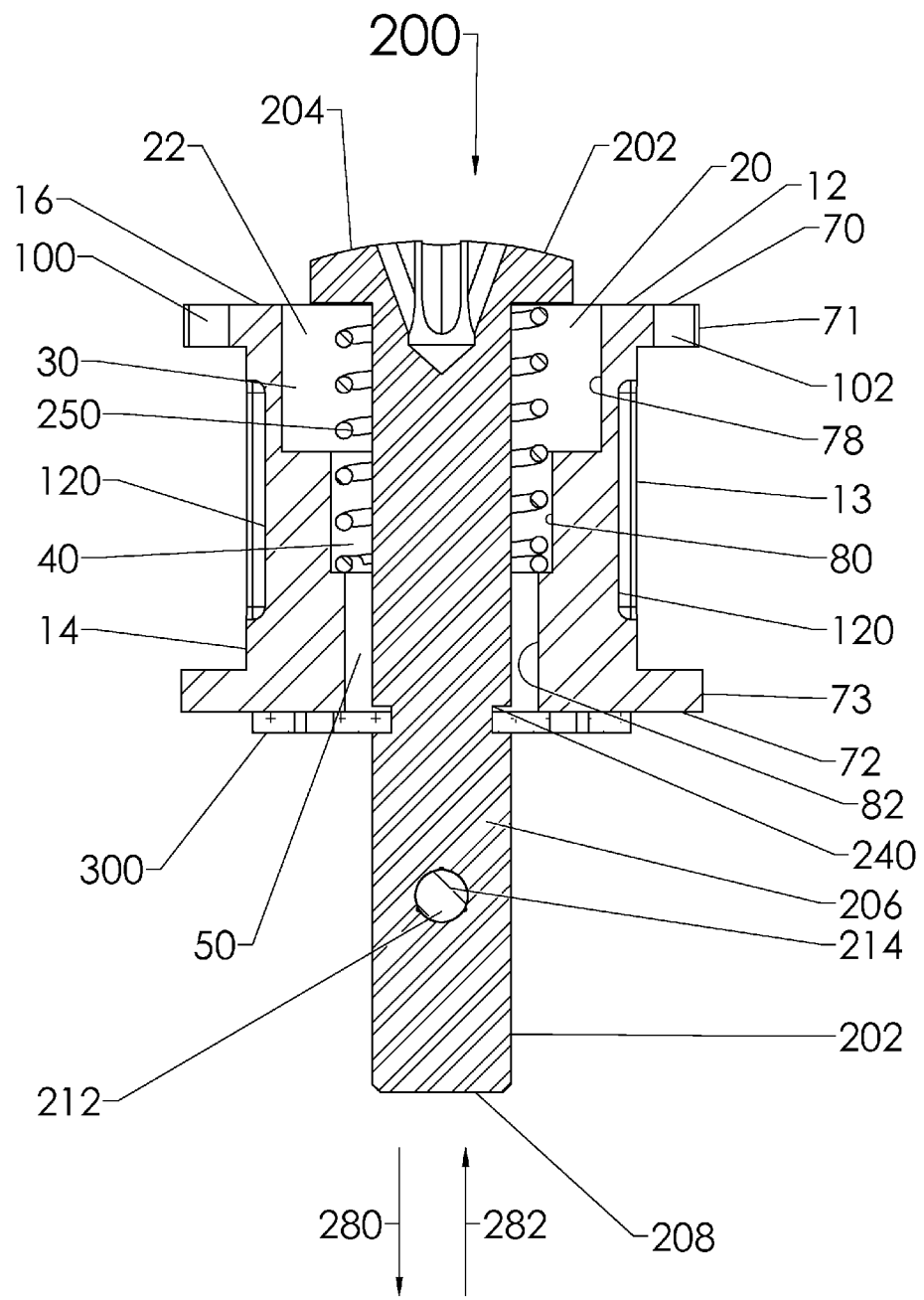
FIG. 13 is a cross-sectional view taken along line 13-13 of FIG. 11.
Figure 14:
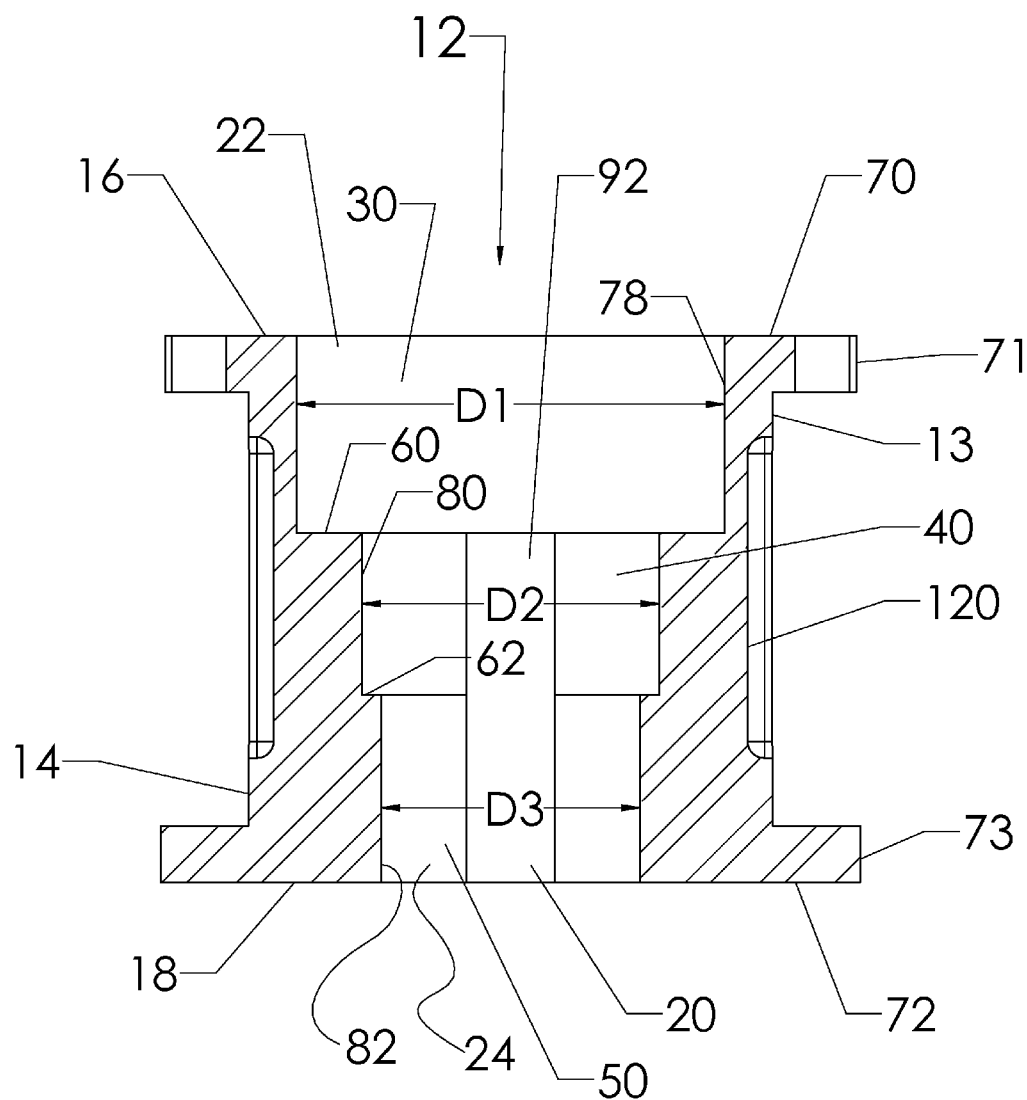
FIG. 14 is a cross-sectional view of the insert.

As shown in FIGS. 6, 7, 8, 12 and 13, the shaft 206 has a circumferentially extending channel or groove 240 therein at a predetermined location between the head 204 and the cross pin 212. When an axial force is applied to the head 204 of the stud 202 to cause the shaft 206 to move longitudinally within the longitudinally extending passage 20 in a first direction 280, the axial force compresses the spring 250 and the circumferentially extending channel 240 becomes exposed (i.e. external to passage 20) and accessible and is in proximity to the second end 18 of the insert 12 as shown in FIGS. 10, 12 and 13. The purpose of channel 240 is described in the ensuing description.

Referring to FIGS. 6-13, 15, 16 and 18, the fastener assembly 200 further comprises a containment ring 300 that is external to the insert 12 and positioned within the circumferential channel 240 of the shaft 206 in order to maintain the spring 250 in a compressed state. When compressed, the spring 250 urges the stud 202 to move longitudinally within the passage 20 in a second direction 282 that is opposite the first direction 280 thereby causing the containment ring 300 to abut the second end 18 of the insert 12. The containment ring 300 limits the movement of the stud 202 in the second direction 282.

The containment ring 300 is fabricated from a resilient material. In one embodiment, the containment ring 300 is fabricated from Delrin. Containment ring 300 comprises an opening 302 that has the shape of a slot. Opening 302 has a central portion 304 that is relatively smaller in size than the size of the distal end 208 of the shaft 206. Such a configuration requires the shaft 206 to be force-fitted through the central portion 304 in order to mount the containment ring 300 on the shaft 206. Since the size of central portion 304 is relatively smaller than the diameter of the shaft 206, a predetermined amount of force is required to mount the containment ring 300 on the shaft 206 and then forcibly slide the containment ring 300 along shaft 206 until it slips into circumferentially extending channel 240. The slot-shaped opening 302 is sized and shaped to allow the sections 214 and 216 of cross pin 212 to pass therethrough. Containment ring 300 has a pair of curved openings 308 and 310 which have several functions. First, the curved openings 308 and 310 enable containment ring 300 to flex when it is slid across the shaft 206. Second, the curved openings 308 and 310 are aligned with corresponding pin members 450 (see FIG. 19B) of containment ring installation tool 400 which is discussed in detail in the ensuing description. Third, the curved openings 308 and 310 are sized so that the containment ring 300 fits snugly on the pin members 450 thereby allowing the installer (i.e. the user) to line up the slot-shaped opening 302 with cross pin 212. As containment ring 300 is being slid across the shaft 206, the sections 214 and 216 of cross pin 212 pass through the slot-shaped opening 302 thereby allowing the containment ring 300 to be positioned within circumferentially extending channel or groove 240.

Figure 8:
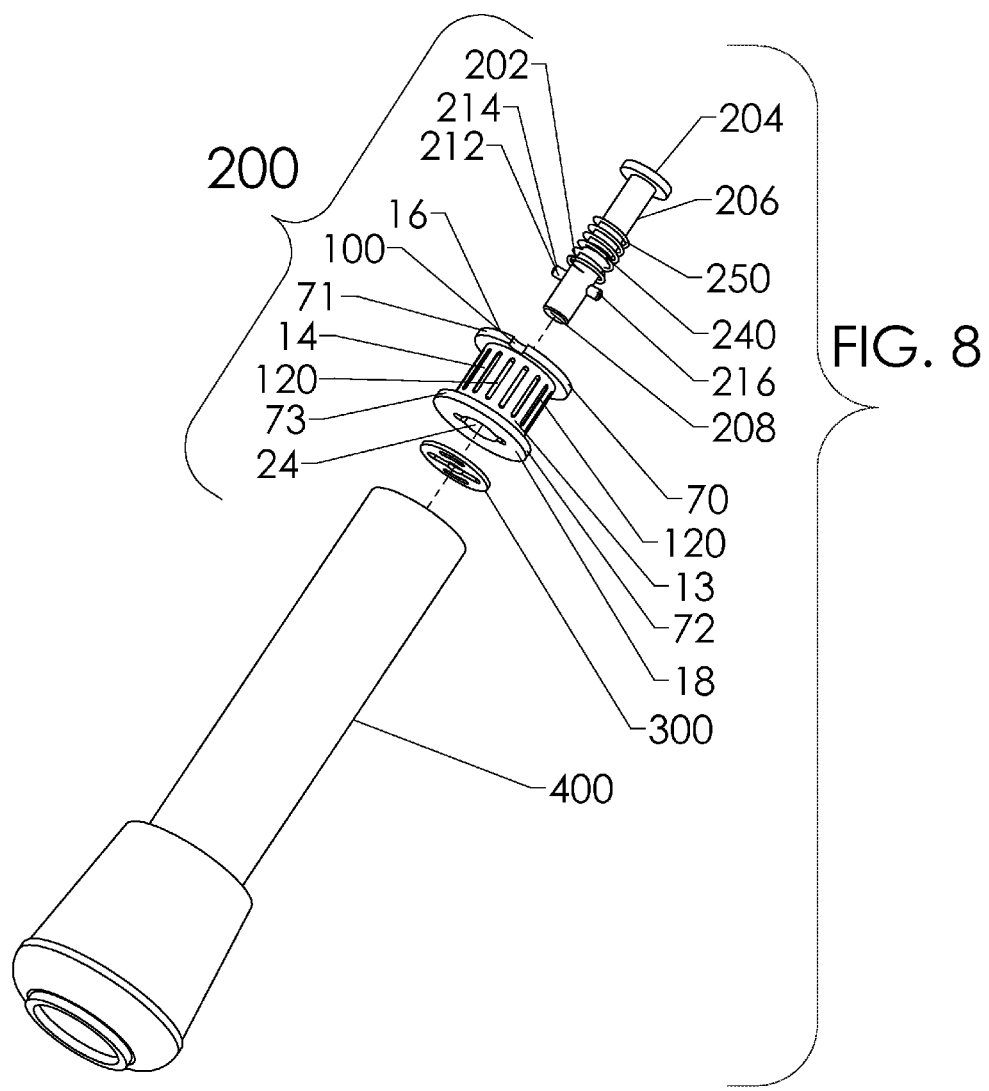
FIG. 8 is an exploded view of the fastener assembly and a containment ring installation tool.
Figure 9:
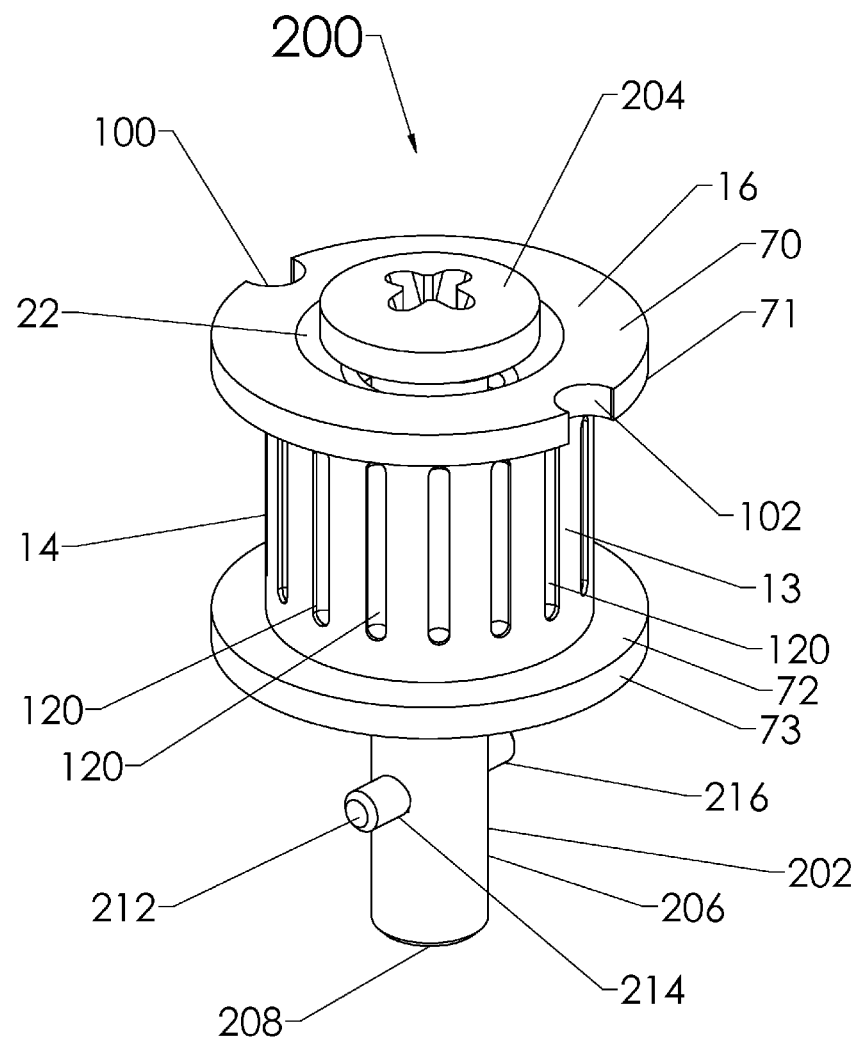
FIG. 9 is a perspective view of the completely assembled fastener assembly.
Figure 19:
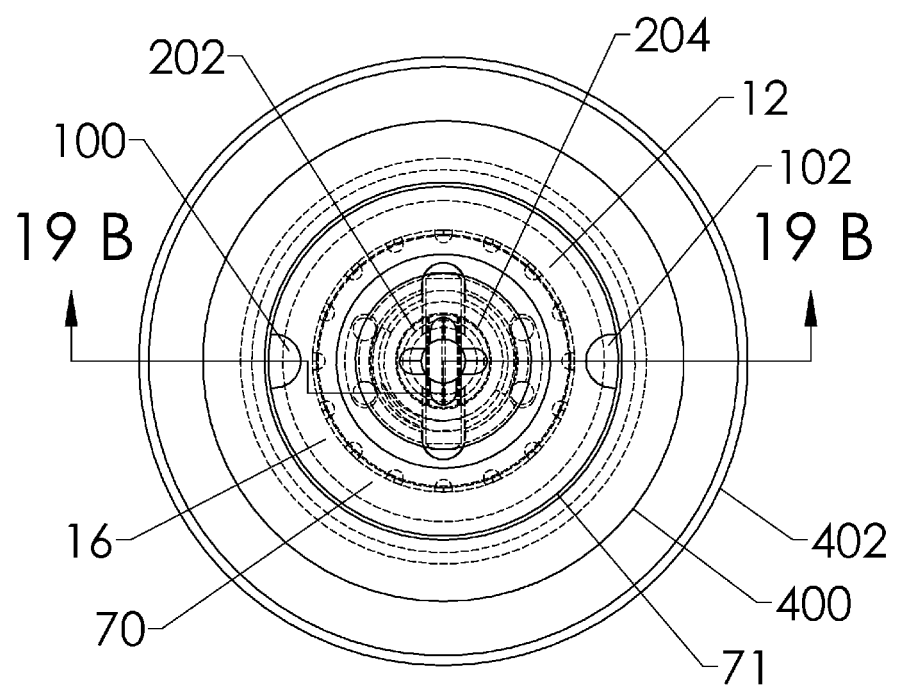
FIG. 19A is a top view showing the fastener assembly positioned on the containment ring installation tool shown in FIG. 8.
FIG. 19B is a cross-sectional view of the fastener assembly and the containment ring installation tool taken along line 19B-19B of FIG. 19A.
Figure 19:
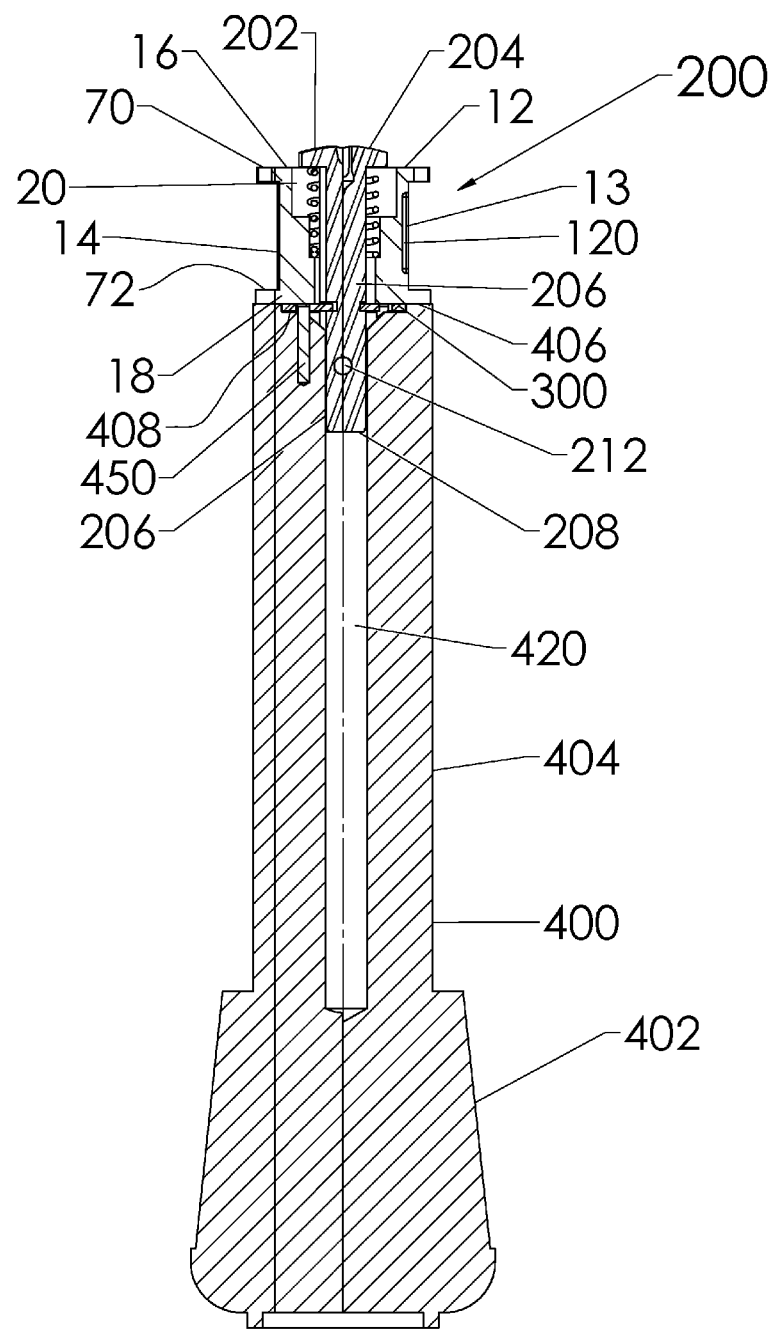

Containment ring installation tool 400, shown in FIGS. 8, 19A and 19B, may be used to mount the containment ring 300 on shaft 206 and slide or push the containment ring 300 along the shaft 206 until the containment ring 300 snaps into the circumferentially extending channel or groove 240. Tool 400 comprises handle 402, shaft 404 and end 406. Shaft 406 has a substantially circular seat 408 that is sized to receive the containment ring 300. The aforementioned pin members 450 extend upward from the seat 408 and are sized to snugly or fit closely through with the curved openings 308 and 310 in containment ring 300. In one embodiment, there is only one pin member 450. In another embodiment, there is more than one pin member 450. Shaft 406 has longitudinally extending bore 420 that is sized to receive the shaft 206 of the stud 202. In order to mount the containment ring 300 on the shaft 206, the installer or user first arranges or positions the containment ring 300 on the seat 408 so that pin members 450 enter the curved openings 308 and 310. Once the containment ring 300 is positioned on the seat 408 and the pin members 450 enter the curved openings 308 and 310, the user or installer then maneuvers tool 400 so that the distal end 208 of the stud 206 is aligned with the slot-shaped opening 302 of the containment ring 300. The user or installer then applies a force on the handle 402 of tool 400 that is sufficient to cause shaft 206 of stud 202 to enter the slot-shaped opening 302 and also the longitudinally extending bore 420 of tool 400. The user or installer then continues to push the containment ring 300 along the shaft 206 and may rotate the tool 400 as needed in order to align cross pin 212 with slot-shaped opening 302. The user or installer continues to apply an axial force on the tool 400 in order to slide the containment ring 300 along the shaft 206 until the containment ring 300 snaps into the circumferentially extending channel or groove 240. Once the containment ring 300 is positioned in the circumferentially extending channel or groove 240, the user or installer then withdraws the tool 400.

Although tool 400 has been described in the foregoing description, it is to be understood that other suitable techniques may be used to mount the containment ring 300 on shaft 206 as well.

Referring to FIGS. 17 and 18, there is shown the fastener assembly 200 used to attach a honeycomb panel 500 to a structure 600. A typical structure 600 is an aircraft interior wall. However, the structure 600 may be on other types of structures found on space vehicles, laboratories, nuclear facilities, etc. The honeycomb panel 500 includes honeycomb panel skins 502 and 504. Insert 12 is cemented to honeycomb panel 500 with epoxy adhesive 700. After the epoxy adhesive 700 hardens, the stud 202 is inserted through spring 250 and the cross pin 212 is attached to the shaft 206 so that the spring 250 is interposed between head 204 and cross pin 212. Next, the stud 202 with the spring 250 mounted thereon is inserted into longitudinally extending passage 20 of insert 12. Cross pin sections 214 and 216 move through channels 90 and 92, respectively, as stud 202 moves through passage 20. The installer or user depresses the stud 202 further into passage 20 in order to compress spring 250 and cause the circumferentially extending channel 240 to become exposed near end 18 of insert 12. The user applies an axial force, indicated by reference number 350, to the stud 202 via a screw driver or other tool while the containment ring 300 is being mounted on the shaft 206. As described in the foregoing description, containment ring installation tool 400 may be used to mount containment ring 300 to shaft 206. Gasket 750 is positioned between honeycomb panel 500 and structure 600. Receptacle 800 is attached to structure 600 with rivets 810. Receptacle 800 has a slot-shaped opening 820 therein. The installer or user then uses a screwdriver to rotate the stud 202 so cross pin 212 can fit through the opening 820. Once cross pin 212 passes through opening 820, the installer or user then rotates the stud 202 so that cross pin 212 is lateral with respect to the slot-shaped opening 820. When the installer removes the force 350 from stud 202, the spring 250 urges stud 202 in the direction indicated by arrow 282 in FIG. 13 so that cross pin 212 is firmly pressed against the exterior surface 830 of receptacle 800. The number of fastener assemblies 200 required to attach a honeycomb panel to a structure depends upon the size of the honeycomb panel.

Thus, the fastener assembly 200 can be installed on a honeycomb panel in relatively less time in comparison to the prior art fastener assemblies. Only one cross pin 212 is used with the stud 202. The cross pin 212 is attached to the stud 202 prior to being inserted into the interior of the insert 12. As the stud 202, with the spring 250 mounted thereon, is moved through the longitudinally extending passage 20, cross pin sections 214 and 216 slide through the channels 90 and 92, respectively, and exit opening 24 of insert 12. Thus, the fastener assembly 200 eliminates the problems associated with having to reinsert the cross pins to the stud as is done with prior art fastener assemblies.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A fastener assembly (200) for use with a honeycomb panel, comprising:

a honeycomb panel insert (12) comprising a generally cylindrical body (13) having a cylindrical outer peripheral surface (14), a first end (16), an opposite second end (18) and a longitudinally extending passage (20) having a first opening (22) in the first end (16) and a second opening (24) in the second end (18), wherein the first opening (22) has a first perimeter (26) and the second opening (24) has a second perimeter that is less than first perimeter;

said longitudinally extending passage (20) comprising a first portion (30) having a first diameter D1, a second portion (40) having a second diameter D2 that is less than the first diameter D1 and a third portion (50) having a third diameter D3 that is less than the second diameter D2, wherein the difference between the first diameter D1 and the second diameter D2 provides a first ledge (60) and the difference between the second diameter D2 and the third diameter D3 provides a second ledge (62);

said first end (16) further comprising a first flange section (70) that has a periphery (71) and said second end (18) further comprising a second flange section (72) that has a periphery (73), wherein said first flange section (70) has a pair of notches (100, 102) located in diametrically opposed positions along the periphery (71);

said second portion (40) of the longitudinally extending passage (20) having an inner wall (80) and the third portion (50) of the longitudinally extending passage (20) having an inner wall (82), wherein the inner walls (80) and (82) have therein longitudinally extending and diametrically positioned channels (90) and (92) that extend to the second end (18) and form portions of the second perimeter of the second opening (24);

a stud (202) comprising a head (204) and a shaft (206) that is attached to the head (204), the shaft (206) extending to a distal end (208) along a longitudinally extending axis (210), the stud (202) further comprising a cross pin (212) that extends through the shaft (206) and is orthogonal with respect to the longitudinally extending axis (210), the cross pin (212) having a first section (214) and a second section (216) that extend from the shaft (206) in opposite directions, wherein the shaft (206) has a diameter that is sized to fit through the longitudinally extending passage (20) and wherein the first section (214) and second section (216) are sized to fit within and move along channels (90) and (92), respectively, the head (204) having a predetermined diameter that is greater than the second diameter D2 of the second portion (40) of passage (20) and less than the first diameter D1 of the first portion (30) of passage (20) so that the head (204) abuts the first ledge (60) when the stud (202) is inserted into the longitudinally extending passage (20);

a spring (250) that is mounted on the shaft (206) and interposed between the head (204) and the cross pin (212), the spring (250) having a predetermined diameter that is less than the second diameter D2 of the second portion (40) and greater than the third diameter D3 of the third portion (50) so that the spring (250) abuts the second ledge (62) when the stud (202) with the spring (250) mounted thereon is inserted into the longitudinally extending passage (20);

said shaft (206) having a circumferential channel (240) therein at a predetermined location between the head (204) and the cross pin (212), wherein when a force is applied to the head (204) so that the shaft (206) moves longitudinally within the passage (20) in a first direction (280), the spring (250) is compressed and the circumferential channel (240) is exposed near the second end (18) of said insert (12); and a containment ring (300) external to the insert (12) and positioned within the circumferential channel (240) of the shaft (206) so as to maintain the spring (250) in a compressed state, wherein the compression of the spring (250) urges the stud (202) to move longitudinally within the passage (20) in a second direction (282) that is opposite the first direction (280) thereby causing the containment ring (300) to abut the second end (18) of the insert (12) thereby limiting the movement of the stud (202) in the second direction (282).

2. The fastening assembly (200) according to claim 1 wherein the containment ring (300) is fabricated from a resilient material and comprises a substantially slot-shaped opening (302) that has a central section (304) which has a size that is smaller than the diameter of the shaft (206) so as to require the shaft (206) to be force fitted through the central section (304) in order to frictionally mount the containment ring (300) on the shaft (206), wherein the substantially slot-shaped opening (304) is sized to allow the cross pin (212) to pass therethrough.

3. The fastening assembly (200) according to claim 1 wherein the distal end (208) of the shaft (206) is beveled.

4. The fastening assembly (200) according to claim 1 wherein the generally cylindrical body (13) has at least one longitudinally extending channel (120) in the cylindrical outer peripheral surface (14).

5. The fastening assembly (200) according to claim 4 wherein the at least one longitudinally extending channel (120) comprises a plurality of longitudinally extending channels (120).

6. The fastening assembly (200) according to claim 5 wherein the plurality of longitudinally extending channels (120) are equidistantly spaced apart from each other.

7. The fastening assembly (200) according to claim 1 wherein the first ledge (60) comprises a circumferentially extending ledge and the second ledge (62) comprises a circumferentially extending ledge.

8. The fastening assembly (200) according to claim 1 wherein the insert (12) is formed from a composite material.

9. The fastening assembly (200) according to claim 1 wherein the containment ring (300) is formed from a composite material.

10. The fastening assembly (200) according to claim 1 wherein the shaft (206) has a bore (213) therein and the cross pin (212) is sized so that the cross pin (212) is force-fitted through the bore (213).

\* \* \* \* \*